Aug. 1, 1939. F. E. BOWERS Re. 21,167

OPHTHALMIC MOUNTING

Original Filed March 23, 1937

FRANK E. BOWERS
INVENTOR.

BY G. A. Ellestad
ATTORNEY.

Reissued Aug. 1, 1939

Re. 21,167

UNITED STATES PATENT OFFICE 21,167

OPHTHALMIC MOUNTING

Frank E. Bowers, Drexel Hill, Pa., assignor to Doyle & Bowers, Philadelphia, Pa., a firm composed of Frank E. Doyle, Frank E. Bowers, and Erwin Schiefer Original No. 2,091,583, dated August 31, 1937, Serial No. 132,570, March 23, 1937. Application for reissue March 1, 1939, Serial No. 259,262

6 Claims. (Cl. 88—45)

This invention relates to ophthalmic mountings and more particularly has reference to a bridge for an eyeglass or spectacle.

One of the objects of this invention is to provide an improved bridge member for an ophthalmic mounting which will be relatively simple in structure, yet neat in appearance and efficient in operation. Another object is to provide means whereby adjustments may be made on a resilient bridge element whose ends contact the edges of the lenses. A further object is to provide a resilient bridge which will be relatively inconspicuous. These and other objects and advantages reside in certain novel features of construction, arrangement and combination of parts as will hereinafter be more fully disclosed and pointed out in the appended claims.

Referring to the drawing.

Figure 1:
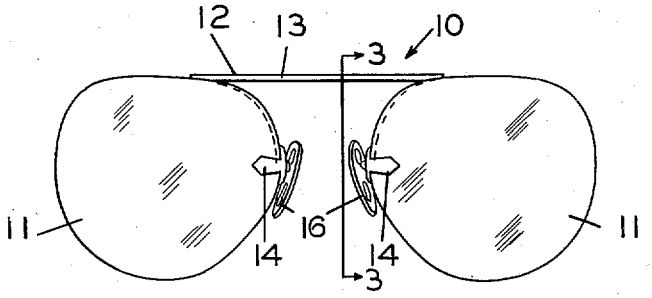
Fig. 1 is a front view of an eyeglass embodying my invention.
Figure 2:
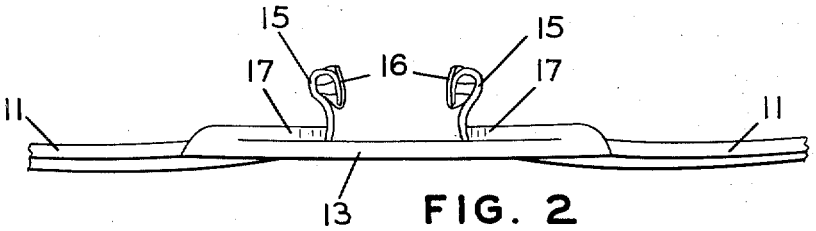
Fig. 2 is an enlarged fragmentary top plan view thereof.
Figure 3:
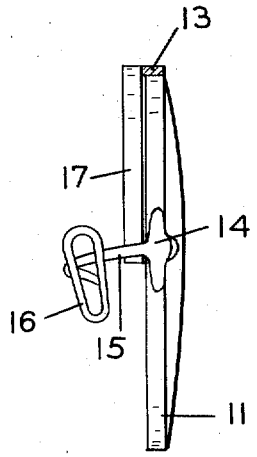
Fig. 3 is a view taken on line 3—3 of Fig. 1.
Figure 4:
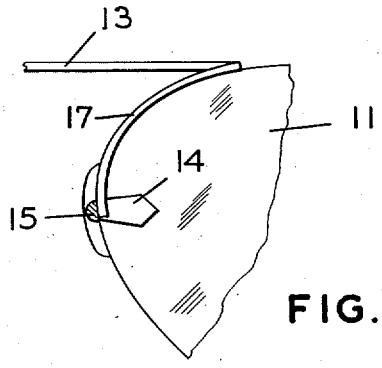
Fig. 4 is a fragmentary rear view of the bridge.

One embodiment of my invention is shown in the drawing wherein 10 indicates an eyeglass having the two lenses 11 connected by a bridge indicated generally at 12. The bridge comprises a substantially flat resilient element 13 which extends tangentially along the top edges of the lenses 11 with its two ends respectively in contact therewith. Secured to the nasal edge of each lens 11 by any suitable means, such as a screw, cement or molded rivet, is a strap 14 which carries a rearwardly extending arm 15 supporting a nose engaging element or pad 16. A member 17, having one end secured to the arm 15, at its junction with strap 14, extends upwardly and outwardly along the periphery of the rear face of the lens to a point adjacent the top edge of the lens where it is secured, as by soldering, to the end of element 13. The members 17 are preferably resilient and they lie in a plane which is spaced rearwardly from the plane of the lenses.

In operation, the lenses 11 are grasped, one in each hand, and turned so as to flex the spring element 13 and separate the pads 16 to receive the nose of the wearer. The two ends of the resilient element 13 are in contact with the upper edges of the lenses and the spring 13 flexes at the intermediate portion. In case the mounting is accidentally bent so that the ends of spring 13 are thrown out of engagement with the upper edges of the lenses, they may be returned to their proper positions by grasping the members 17, attached to element 13, with pliers and making the necessary adjustments. The members 17 are spaced behind the lenses and they extend upwardly from the lens holding strap 14 along the periphery of the lens so that they are hardly visible from the front of the eyeglasses. This renders the mounting quite inconspicuous.

From the foregoing it will be apparent that I am able to attain the objects of my invention and provide an improved eyeglass mounting which will be simple in structure and present a neat appearance. Various modifications may be made without departing from the spirit of my invention as pointed out in the appended claims.

I claim:

1. An ophthalmic mounting comprising a pair of lenses, a lens holding device secured to the nasal edge of each lens, a nose pad carried by each of said devices, a member carried by each device and extending upwardly and substantially following the contour of the lens to a point adjacent the top edge of the lens, said members being spaced rearwardly from the rear faces of the lenses, and a resilient bridge element and means connecting the two upper ends of said members to said element, the end portions of said element being in contact, respectively, with the upper edges of the lenses.

2. An ophthalmic mounting comprising a pair of lenses, a lens holding device secured to each of said lenses, an arm secured to each of said devices and extending rearwardly therefrom, a nose pad carried by each arm, a resilient member secured to each of said arms and extending upwardly therefrom along the edge of the lens, each of said members lying in a plane which is positioned rearwardly of the lenses, and a resilient bridge element and means connecting the two upper ends of said members to the respective ends of said element, the two ends of said element being in contact, respectively, with the upper edges of the lenses.

3. An ophthalmic mounting comprising a pair of lenses, a lens holding device secured to each lens, a nose engaging element carried by each device, a member carried by each device, said members being positioned in a plane which is spaced rearwardly from the plane of the lenses, each of said members extending upwardly and outwardly from a point adjacent the nasal edge of the lens and substantially following the contour of the lens, and a resilient bridge element, and means connecting the upper ends of said members to the respective ends of said element, said bridge lying substantially in the plane of said lenses.

4. An ophthalmic mounting comprising a pair of lenses, a lens holding device secured to the nasal edge of each lens, a nose pad carried by each device, a resilient member secured to each device and extending upwardly and outwardly along the periphery of the rear face of the lens, said members being positioned in a plane which is spaced rearwardly from the plane of the lenses, and a resilient bridge element extending in tangential relation along the upper edges of the lenses, and connecting means whereby the upper ends of said members are attached, respectively, to the two ends of said element, the two ends of said element being in contact with the upper edges of the respective lenses.

5. An ophthalmic mounting comprising a pair of lenses, a lens holding device secured to the nasal edge of each lens, a nose-engaging element carried by each device, a member carried by each device, said members being positioned in a plane which is spaced rearwardly from the plane of the lenses, each of said members extending upwardly and outwardly from a point adjacent the nasal edge of the lens and substantially following the contour of the lens, a resilient bridge element and laterally extending means connecting said members to the respective ends of said bridge element, said bridge element lying substantially in the plane of the lenses with its ends contacting, respectively, the upper edges of the lenses.

6. An ophthalmic mounting comprising a pair of lenses, a lens holding device secured to the nasal edge of each of said lenses, an arm secured to each device and extending rearwardly therefrom, a nose-engaging pad carried by each arm, a member carried by each device and extending upwardly and outwardly therefrom and substantially following the contour of the lens, each of the members lying in a plane which is spaced rearwardly of the lenses, a resilient bridge element and laterally extending means connecting said members to the respective ends of said element, the two ends of said element being in contact, respectively, with the upper edges of the lenses.

FRANK E. BOWERS.